United States Patent [19]
Robert

[11] 3,903,297
[45] Sept. 2, 1975

[54] METHOD OF TREATMENT AND PROPHYLAXIS OF GASTRIC HYPERSECRETION AND GASTRIC AND DUODENAL ULCERS USING PROSTAGLANDIN ANALOGS

[75] Inventor: Andre Robert, Kalamazoo, Mich.

[73] Assignee: The Upjohn Company, Kalamazoo, Mich.

[22] Filed: June 10, 1974

[21] Appl. No.: 477,764

Related U.S. Application Data

[63] Continuation-in-part of Ser. No. 411,956, Nov. 1, 1973, abandoned, which is a continuation of Ser. No. 230,988, March 1, 1972, abandoned, which is a continuation-in-part of Ser. No. 191,899, Oct. 22, 1971, abandoned.

[52] U.S. Cl.................................. 424/305; 424/318
[51] Int. Cl.² ................. A61K 31/20; A61K 31/215

[58] Field of Search.......................... 424/305, 318

[56] References Cited
UNITED STATES PATENTS
3,813,433   5/1974   Pike et al............................ 424/305

*Primary Examiner*—Stanley J. Friedman
*Attorney, Agent, or Firm*—Edward G. Jones; Bruce Stein

[57] ABSTRACT

16-Alkyl and 16,16-dialkyl substituted prostaglandins of the $PGE_1$ type $PGE_2$ type, $PGA_1$ type, and $PGA_2$ type are administered in pharmaceutical preparations orally or parenterally to humans and useful warmblooded animals for the prophylaxis and treatment of gastric hypersecretion and gastric and duodenal ulcers.

9 Claims, No Drawings

METHOD OF TREATMENT AND PROPHYLAXIS OF GASTRIC HYPERSECRETION AND GASTRIC AND DUODENAL ULCERS USING PROSTAGLANDIN ANALOGS

CROSS REFERENCE TO RELATED APPLICATIONS

This application is a continuation-in-part of copending application Ser. No. 411,956 filed Nov. 1, 1973, now abandoned, which is a continuation of copending application Ser. No. 230,988 filed Mar. 1, 1972, now abandoned, which is a continuation-in-part of copending application Ser. No. 191,899 filed Oct. 22, 1971, now abandoned.

BACKGROUND OF THE INVENTION

Since the early work of von Euler where "Prostaglandin" referred to an extract of the prostate and vesicular glands of sheep containing lipid-soluble acids, continued research and development have followed in this area of substances related to prostanoic acid. The latter is represented structurally as

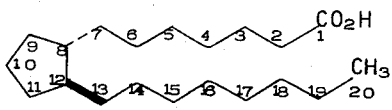

A systematic name for this compound is 7-[(2β-octyl)-cyclopent-1α-yl]-heptanoic acid.

Isolation and purification of naturally occurring prostaglandins have continued as have preparation of derivatives and biological studies. Simplified names and abbreviations have become the art usage to designate the various prostanoic acids. For example, 15(S)-hydroxy-9-oxo-cis-5,10-trans-13-prostatrienoic acid has become known as prostaglandin $A_2$ or $PGA_2$. 11α,15(S)-dihydroxy-9-oxo-cis-5-trans-13-prostadienoic acid has become known as prostaglandin $E_2$ or $PGE_2$. Ramwell et al., "Prostaglandins" in Progress in the Chemistry of Fats and Other Lipids, Vol. 9, edited by R. Holman, pp. 231–273, Pergamon Press, Oxford, 1968, present a detailed description of preparation and nomenclature. Microbiological conversions of unsaturated fatty acids to PGE-type compounds, including $PGE_1$ and $PGE_2$, are described in U.S. Pat. No. 3,296,091, Rec. Trav. Chim. 85, 1233 (1966), and ibid., 87, 461 (1968). Also, Bergstrom, Carlson, and Weeks, Pharmacological Reviews, Vol. 20, No. 1, March (1968), review and describe "The Prostaglandins".

Biological studies of the prostaglandins, for example, actions on smooth muscle, reproductive system, nervous system, cardiovascular system, and relationship to lipid and carbohydrate metabolism, and miscellaneous effects are summarized by Bergstrom et al. cited above. Further biological studies are included in the following references: Bygdeman (1964) Acta. Physiol. Scand. 63 (suppl. 242), 1; Pickles and Hall (1963) J. Reprod. Fert. 6, 315 and Sandberg et al. (1965) Acta. Obstet. Gynec. Scand. 44, 585. Also Karim, S.M.M. (1966) J. Obstet. Gynaec. Brit. Cwlth. 73, 903; Karim and Devlin (1967) ibid., 230; and Wiqvist et al., Am. J. Obstet. Gyn. 102, 327–332 (1968). Robert et al., Am. J. Digestive Diseases, Vol. 12, No. 10 (1967), 1073–1076 describe the efects of $PGE_1$, $PGE_2$, $PGA_1$, and $PGF_2$ on gastric secretion in stimulated dogs.

Each of the prostaglandin analogs $E_1$, $E_2$, $A_1$, and $A_2$ used in this invention has one or two methyl or ethyl substituents at C-16, i.e. the carbon atom adjacent to the hydroxyl-substituted C-15 carbon atom. Thus, these prostanoic acid analogs are designated 16-methyl $E_1$, $E_2$, $A_1$, or $A_2$ prostaglandin, 16-ethyl $E_1$, $E_2$, $A_1$, or $A_2$ prostaglandin, 16,16-dimethyl $E_1$, $E_2$, $A_1$, or $A_2$ prostaglandin, 16,16-diethyl $E_1$, $E_2$, $A_1$, or $A_2$ prostaglandin, and 16-ethyl-16-methyl $E_1$, $E_2$, $A_1$, or $A_2$ prostaglandin. Also included in this invention are the lower alkyl carboxylate esters where the alkyl group has 1 to 8 carbon atoms, inclusive, and the pharmaceutically acceptable salts of the prostaglandin analogs.

Pharmaceutically acceptable salts as referred to in this invention are those which are acceptable both for formulation and compounding into appropriate dosage forms, and which are suitable for systemic and local use in mammals.

Pharmaceutically acceptable salts for example, are those of alkali metals and alkaline earth bases, such as the sodium, potassium, calcium, and magnesium; those of ammonia or a basic amine such as mono-, di-, and triethyl amines, benzylamine, heterocyclic amines such as piperidine and morpholine, and amines containing water-solubilizing or hydrophilic groups such as triethanolamine, tris(hydroxymethyl)aminomethane, and phenylmonoethanolamine are disclosed, inter alia, in U.S. Pat. Nos. 3,069,322, 3,598,858, and British Patent No. 1,040,544. Carboxylate esters such as methyl, ethyl, propyl, butyl, pentyl, hexyl, heptyl, octyl, and the isomeric forms thereof where the esterifying alcohol has 1 to 8 carbon atoms, inclusive, especially 1 to 4 carbon atoms, are formed by the usual methods, e.g., reaction with diazomethane or similar diazohydrocarbons as in U.S. Pat. Nos. 3,069,322, 3,598,858, and British Patent No. 1,040,544, or by reaction of the silver salt of the acid with the appropriate alkyl iodide by procedures known in the art.

Like the natural prostaglandins, these 16-mono-substituted or 16,16-di-substituted prostaglandin analogs have several centers of asymmetry. In addition to those found in the natural prostaglandins, there is an asymmetric center at C-16 when the carbon atom is mono-substituted as in the 16-methyl or 16-ethyl PG compounds. Illustratively, 16-methyl-$PGE_2$, therefore, has two C-16 epimers, both useful according to this invention, both having the same configuration at the other asymmetric centers as that of natural $PGE_2$, i.e. alpha for the side chain at C-8 and alpha for the hydroxyls as C-11 and C-15. The prostanoic acid analogs of this invention include the corresponding racemic forms. Racemic form as used herein, includes racemic mixtures, racemic compounds, and racemic solid solutions. See Eliel, E. L., "Stereochemistry of Carbon Compounds," McGraw-Hill, New York, 1962, p. 43–47. A specific compound plus its mirror image (enantiomer) are necessary in combination to describe a racemic form. For convenience hereinafter, when the word "racemic" precedes the name of one of the prostanoic acid derivatives of this invention, the intent is to designate a racemic form represented by the combination of the appropriate compound and the enantiomer of that compound. When the word "racemic" does not precede the compound name, the intent is to designate an optically active compound represented only by the appropriate formula and with the same absolute configuration as $PGE_1$ or $PGE_2$ obtained from animal tissues.

The 16-alkyl and 16,16-dialkyl PGE$_2$ type acids described above, both racemic and optically active, are prepared by a sequence of reactions starting with a compound of the formula

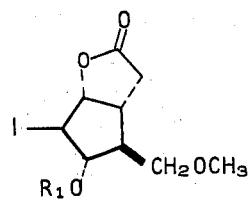

I wherein R$_1$ is acetyl or benzoyl. See Offenlengungsschrift 2,217,044, Oct. 26, 1972. This formula I starting material wherein R$_1$ is acetyl is known in the art in racemic and optically active form, i.e., both (+) and (−) forms. See Corey et al., J. Am. Chem. Soc. 91, 5675 (1969), and ibid., 92, 397 (1970). The (−) form is used as an intermediate to prepare optically active PGE$_2$ type compounds of the natural configuration. This acetyl compound is prepared by actylation of the corresponding hydroxy iodolactone. The formula I intermediate wherein R$_1$ is benzoyl is prepared by reaction of the same hydroxy iodolactone with benzoyl chloride in the presence of pyridine, advantageously at about 25° C. under a nitrogen atmosphere, the benzoyl compound being isolated by methods known in the art. To prepare optically active PGE$_2$ type compound of the natural configuration, the (−) hydroxy iodolactone is used as a reactant.

The formula I starting material is then transformed in several steps to an intermediate of the formula

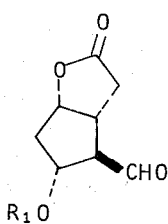

II wherein R$_1$ is defined above. The procedures for preparing II wherein R$_1$ is acetyl are described by Corey et al., cited above. The same procedures are used when R$_1$ in I and II is benzoyl.

Next, the intermediate of formula II is transformed further to an intermediate of the formula

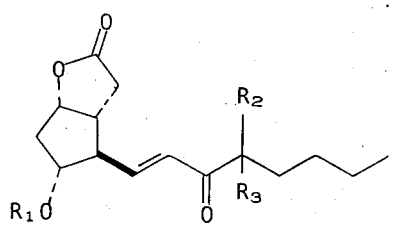

III wherein R$_1$ is as defined above, R$_2$ is methyl or ethyl, and R$_3$ is hydrogen, methyl, or ethyl. The transformation of II to III is carried out as described by Corey et al., cited above, for the transformation of II wherein R$_1$ is acetyl to an intermediate of the formula

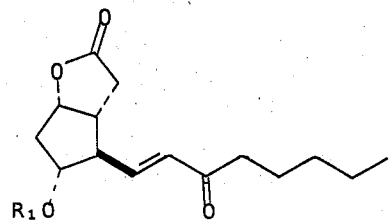

IV wherein R$_1$ is acetyl. In place of the sodio derivative of dimethyl 2-oxoheptylphosphonate used by Corey et al. to make IV, the corresponding sodio derivative of a phosphonate of the formula

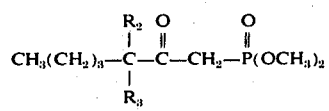

V wherein R$_2$ and R$_3$ are as described above, is used to make III. These formula V phosphonates are prepared from the ethyl esters of the appropriate 2-alkyl- and 2,2-dialkyl-substituted hexanoic acids by methods known in the art.

The formula III intermediates are then transformed to the desired PGE$_2$ type acids and esters, both racemic and optically active, of the formula

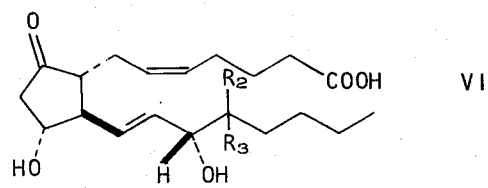

VI wherein R$_2$ and R$_3$ are as defined above. The procedures for this multi-step transformation are the same used by Corey et al., cited above, to transform intermediate IV to PGE$_2$ or racemic PGE$_2$.

The 16-alkyl and 16,16-dialkyl PGE$_1$ type acids and esters described above are obtained by partial catalytic hydrogenation of the corresponding 16-alkyl and 16,16-dialkyl acids and esters of formula VI, or preferably the ditetrahydropyranyl ethers of those PGE$_2$ type compounds. For this purpose, 5% rhodium metal on alumina is a suitable catalyst, about 20°–30° C. is a suitable raction temperature, and ethyl acetate or a mixture of ethyl acetate and methanol is a suitable reaction diluent. A hydrogenation pressure of one to 2 atmospheres of hydrogen is suitable, and contact of the reaction mixture is continued until thin layer chromatography shows the absence of starting material.

The 16-alkyl and 16,16-dialkyl PGA$_1$ type and PGA$_2$ type acids and esters described above are prepared by acidic dehydration of the corresponding PGE$_1$ type and PGE$_2$ type acids and esters, respectively. For example, acidic dehydration of 16-ethyl-PGE$_2$ gives 16-ethyl-PGA$_2$. These acidic dehydrations are carried out by methods known in the art for acidic dehydrations of known prostanoic acid derivatives. See, for example, Pike et al., Proc. Nobel Symposium II, Stockholm (1966), Interscience Publishers, New York, pp. 162–163 (1967); and British Specification No. 1,097,533. Alkanoic acids of 2 to 6 carbon atoms, inclusive, especially acetic acid, are preferred acids for this acidic dehydration. Dilute aqueous solutions of mineral acids, e.g., hydrochloric acid, especially in the presence of a solubilizing diluent, e.g., tetrahydrofuran, are also useful as reagents for this acidic dehydration, although these reagents may cause partial hydrolysis of an ester reactant.

Ulcers as referred to in this invention mean a loss of substance on a mucous surface, causing gradual disintegration and necrosis of the tissues. These ulcers are of two types, gastric (stomach) and duodenal (duodenum).

The etiology of gastric and duodenal ulcers includes many factors. One of the most important factors is gastric hypersecretion. Secretions of the stomach are aqueous and contain hydrochloric acid, proteolytic enzymes (pepsin and rennin), other enzymes, a hormone (gastrin), electrolytes and other endogenous compounds. Gastric secretions as used in this invention means hydrochloric acid and proteolytic enzymes. Gastric hypersecretion as used in this invention means an increase in volume of gastric secretion and/or an increase in the amount of the hydrochloric acid or proteolytic enzymes over the normal physiological level.

In both the treatment of existing ulcers and preventing recurrence of ulcers, it is desirable to decrease gasacidity with antacids. However, it is preferable to prevent or decrease the acidic secretions in the first place by the use of antisecretory agents. A number of anticholinergic antisecretory agents are being used in the treatment and prophylaxis of gastric and duodenal ulcers. They include, for example, atropine, propantheline (Probanthine) and isopramide (Darbid).

Certain naturally occuring prostaglandins, $PGE_1$, $PGE_2$, and $PGA_1$ have been found to inhibit gastric secretion in rats (Robert, A., Antisecretory Property of Prostaglandins, Prostaglandin Symposium of the Worcester Foundation for Experimental Biology, Oct. 16–17, 1967, Interscience, New York, 1968, p. 47 and Robert et al. Gastroenterology 55, 481 (1968)), dogs (Robert, A., Antisecretory Property of Prostaglandins, cited above; Robert et al., Gastroenterology 54, 1263 (1968); and Nezamis et al., J. Physiology (London) 218, 369 (1971)) and humans (Wilson et al., Gastroenterology 61, 201 (1971); Classen et al., Klin. Wschr. 48,876 (1970); Classen et al., Digestion 4, 333 (1971); and Wada et al., Jap. J. Clin. Med. 28, 2465 (1970)).

In all the above studies, the prostaglandins were administered parenterally, either intravenously (dogs, humans) or subcutaneously (rats). The duration of effect of these natural prostaglandins on gastric secretion was always limited to about one hour.

U.S. Pat. No. 3,781,429 discloses a method of inhibiting intestinal lesions produced by non-steroidal anti-inflammatory agents in mammals by administering orally certain prostaglandins of the E series, certain 11-deoxy derivatives thereof, and certain prostaglandins of the A series.

SUMMARY OF THE INVENTION

This invention relates to a method of treating gastric hypersecretion in a mammal which consists essentially of administering an effective amount of a pharmaceutical preparation for an antisecretory effect on gastric hypersecretion orally or parenterally in a unit-dosage form or a multiple-dosage form comprising an optically active compound or a racemic form of that compound and the enantiomer thereof selected from the group consisting of 16-methyl-$PGE_1$, -$PGE_2$, -$PGA_1$, -$PGA_2$,
16,16-dimethyl-$PGE_1$, $PGE_2$, -$PGA_1$, -$PGA_2$,
16-ethyl-$PGE_1$, -$PGE_2$, -$PGA_1$, -$PGA_2$,
16,16-diethyl-$PGE_1$, -$PGE_2$, -$PGA_1$, -$PGA_2$,
16-ethyl-16-methyl-$PGE_1$, -$PGE_2$, -$PGA_1$, -$PGA_2$, pharmaceutically acceptable salts thereof, and pharmaceutically acceptable carboxylate alkyl esters thereof where the alkyl group is one to 8 carbon atoms, inclusive, in combination with a pharmaceutical carrier.

The novel method of this invention is especially useful in the treatment of humans. It is also useful in the treatment of pigs. In the novel method of this invention it is preferred that the route of administration be oral. It is also preferred that the compound is 16,16-dimethyl-$PGE_2$ in free acid form, salt form or methyl ester form.

DETAILED DESCRIPTION

This invention provides a method of treating gastric and duodenal ulcers and preventing recurrence of the ulcers by decreasing the volume, acidity and enzymatic content of gastric secretions in mammals.

More specifically, this invention provides a method of treating gastric and duodenal ulcers and preventing recurrence of the ulcers in mammals including especially humans and pigs by decreasing the volume, acidity and enzymatic content of gastric secretions by oral or parenteral administration of one of the above-mentioned 16-alkyl or 16,16-dialkyl prostaglandin analogs.

While the natural prostaglandins mentioned above have been found to inhibit gastric secretions in mammals, the prostaglandin analogs of this invention are more potent, are active orally and have a longer duration of action.

When taken orally, the amount of prostaglandin analog necessary to produce the desired therapeutic effect is about 0.5–5 $\mu$g./kg., 2 to 4 times daily. More preferred is 1–3 $\mu$g./kg., 2 to 4 times daily. A 50 kg. mammal would receive 25–250 $\mu$g., 2 to 4 times daily orally. A more preferred dosage is 75–125 $\mu$g., 2 to 4 times daily for a 50 kg. mammal.

When administered by intravenous, subcutaneous, or intramuscular injection the amount of the prostaglandin analog necessary to produce the desired therapeutic effect is about 0.01–2.0 $\mu$g./kg. administered 2 to 4 times daily. A 50 kg. mammal would receive 0.5–100 $\mu$g. 2 to 4 times daily either intravenously or subcutaneously by injection.

Administration is also by intravenous infusion. The amount of the prostaglandin analog necessary to produce the desired therapeutic effect is about 0.001–0.02 $\mu$g./kg./min. for 2 to 4 hour intervals, 2 to 3 times daily.

The prostaglandin analogs in an effective therapeutic amount are administered in pharmaceutical preparations formulated for parenteral or oral administration. Oral administration is preferred. The oral, pharmaceutical preparations include both solid and liquid dosage forms.

Parenteral administration includes intravenous, subcutaneous, intramuscular, and the like.

Preparations for parenteral administration include sterile solutions ready for injection, sterile dry soluble products ready to be combined with a solvent just prior to use, including hypodermic tablets, sterile suspensions ready for injection, sterile dry insoluble products ready to be combined with a vehicle just prior to use and sterile emulsions. The solutions may be either aqueous or non-aqueous.

Pharmaceutically acceptable substances utilized in parenteral preparations include aqueous vehicles, non-aqueous vehicles, antimicrobial agents, isotonic agents, buffers, antioxidants, local anesthetics, suspending and dispersing agents, emulsifying agents, sequestering or chelating agents and other pharmaceutical necessities.

Examples of aqueous vehicles include Sodium Chloride Injection, Ringer's Injection, Isotonic (5 percent) Dextrose Injection, Sterile Water for Injection, Dextrose and Sodium Chloride Injection and Lactated Ringer's Injection. Non-aqueous parenteral vehicles include fixed oils of vegetable origin, for example, cottonseed oil, corn oil, sesame oil and peanut oil. Antimicrobial agents in bacteriostatic or fungistatic concentrations must be added to parenteral preparations packaged in multiple-dose containers (vials) which include phenol or cresols, mercurials, benzyl alcohol, chlorobutanol, methyl, and propyl p-hydroxybenzoic acid esters, thimerosal, benzalkonium chloride and benaethonium chloride. Isotonic agents include, for example, sodium chloride and dextrose. Buffers include, for example, phosphate and citrate. Antioxidants include, for example, sodium bisulfite. Local anesthetics include, for example, procaine hydrochloride. Suspending and dispersing agnets include, for example, sodium carboxymethylcellulose, hydroxypropyl methylcellulose and polyvinylpyrrolidone. Emulsifying agents include, for example, Polysorbate 80 (Tween 80). A sequestering or chelating agent of metal ions include, for example, EDTA (ethylenediaminetetraacetic acid). Pharmaceutical necessities include, for example, ethyl alcohol, polyethylene glycol and propylene glycol for water miscible vehicels and sodium hydroxide, hydrochloric acid, citric acid, or lactic acid for pH adjustment.

The concentration of the pharmaceutically active ingredient is adjusted so that an injection, for example, 0.5 ml., 1.0 ml., 2.0 ml., and 5.0 ml. or an intravenous infusion, for example, 0.5 ml./min., 1.0 ml./min., 1.0 ml./min. provides an effective amount to produce the desired pharmacological effect. The exact dose depends on the age, weight, and condition of the patient or animal as is known in the art.

The unit-dose parenteral preparations are packaged, for example, in an ampule or a syringe with a needle. The multiple-dose package, for example, is a vial.

All preparations for parenteral administration must be sterile, as is known and practiced in the art.

Illustratively, intravenous infusion of a sterile aqueous solution containing a prostaglandin analog is an effective mode of administration. Another embodiment is a sterile aqueous or oily solution or suspension containing a prostaglandin analog injected as necessary to produce the desired pharmacological effect.

Oral pharmaceutical dosage forms are either solid or liquid. The solid dosage forms are tablets, capsules, granules and bulk powders. Types of oral tablets are, for example, compressed (including chewable and lozenge), tablet triturates, enteric-coated, sugar-coated, film-coated, and multiple compressed. Capsules are either hard or soft elastic gleatin. Granules and powders are either effervescent or non-effervescent.

Pharmaceutically acceptable substances utilized in compressed tablets are binders, lubricants, diluents, disintegrating agents, coloring agents, flavoring agents, flow inducing agents, and wetting agents. Tablet triturates (either molded or compressed) utilize diluents and binders. Enteric-coated tablets, due to their enteric-coating, resist the action of stomach acid and dissolve or disintegrate in the alkaline intestine. Sugar-coated tablets are compressed tablets to which usually four different layers of pharmaceutically acceptable substances have been applied. Film-coated tablets are compressed tablets which have been coated with a water soluble cellulose high polymer. Multiple compressed tablets are compressed tablets made by more than one compression cycle utilizing the pharmaceutically acceptable substances previously mentioned. Coloring agents are utilized in all the above dosage forms. Flavoring and sweetening agents are utilized in compressed tablets, tablet triturates, sugar coated, multiple compressed and chewable tablets. Flavoring and sweetening agents are especially useful in the formation of chewable tablets and lozenges.

Examples of binders include glucose solution (25–50%), acacia mucilage (10–20%), gelatin solution (10–20%), sucrose and starch paste. Lubricants include, for example, talc, starch, magnesium or clacium stearate, lycopodium and stearic acid. Diluents include, for example, lactose, sucrose, starch, kaolin, salt, mannitol, and dicalcium phosphate. Disintegrating agents include, for example, corn starch, potato starch, bentonite, methylcellulose, agar, and carboxymethylcellulose. Coloring agents include, for example, any of the approved certified water soluble FD and C dyes, mixtures thereof, and water insoluble FD and C dyes suspended on alumia hydrate. Sweetening agents include, for example, sucrose, lactose, mannitol, and artificial sweetening agents such as sodium cyclamate and saccharin, and any number of spray dried flavors. Flavoring agents include natural flavors extracted from plants such as fruits and synthetic blends of compounds which produce a pleasant sensation. Flow inducing agents include, for example, silicon dioxide and talc. Wetting agents include, for example, propylene glycol monostearate, sorbitan monooleate, diethylene glycol monolaurate, and polyoxyethylene laural ether. Enteric-coatings include, for example, fatty acids, fats, waxes, shellac, ammoniated shellac and cellulose acetate phthalates. Pharmaceutically acceptable substances for the first layer, an undercoating, of sugar-coated tablets include, for example, dextrin and gelatin. The second layer, an opaque zone, includes, for example, starch, talc, calcium carbonate, magnesium oxide, and magnesium carbonate. The third layer, a translucent zone, includes, for example, sucrose. The fourth layer, a glaze, includes, for example, beeswax, carnauba wax, or a mixture of these waxes. Film coatings include, for example, hydroxyethylcellulose, sodium carboxymethylcellulose, polyethylene glycol 4000 and cellulose acetate phthalate.

Hard gelatin capsules, sizes 5 through 000, are made largely from gelatin and may be either clear or colored. These capsules may be filled with either a powder or coated pellets (sustained release).

The diluents utilized in powder filled capsules are the same as those illustrated above for tablets. Pharmaceutically acceptable substances utilized for coating pellets include, for example, stearic acid, palmitic acid, glyceryl myristate, cetyl alcohol, fats, waxes, polymeric substances sensitive to small changes in pH of the gastrointestinal tract, polyvinyl alcohol, ethyl cellulose, and mixtures of beeswax, carnauba wax or bayverry wax with glyceryl monostearate.

Soft elastic gelatin capsules contain sufficient glycerin so that they are permanently flexible. Pharmaceutically acceptable liquid diluents used in soft elastic gelatin capsules are those which do not dissolve or harm the capsule and which are non-toxic, including, for example, corn oil, cottonseed oil, and polysorbate 80.

Pharmaceutically acceptable substances utilized in noneffervescent granules, for solution and/or suspension, include diluents, wetting agents, flavoring agents, and coloring agents. Examples of diluents, wetting agents, flavoring agents and coloring agents include those previously exemplified.

Pharmaceutically acceptable substances utilized in effervescent granules and powders include organic acids, a source of carbon dioxide, diluents, wetting agents, flavoring agents, and coloring agents.

Examples of organic acids include, for example, citric acid and tartaric acid. Sources of carbon dioxide include, for example, sodium bicarbonate and sodium carbonate. Examples of sweetening agents include, for example, sucrose, calcium cyclamate and saccharin. Examples of diluents, wetting agents, and coloring agents include those previously exemplified.

Bulk powders have the prostaglandin analog uniformly dispersed throughout a pharmaceutically acceptable powdered carrier diluent. Examples of the diluent include those previously exemplified.

The individual oral solid pharmaceutical dosage forms, tablets and capsules, are packaged individually, unit-dose, or in quantity, multiple dose containers, for example, bottles of 50, 100, 500, 1000, or 5000.

The amount of prostaglandin analog per dosage unit (tablet or capsule) is adjusted so that a tablet or capsule, a fraction or multiple thereof, provides the patient with an effective amount. The exact dose depends on the age, weight and condition of the patient or animal as is known in the art. Tablets and capsules are given in sufficient number and frequency to obtain the desired pharmacological effect.

The sustained release tablets and capsules provide an effective amount upon ingestion and continue to release a sufficient amount of the prostaglandin analog to keep the concentration of the prostaglandin analog at an effective level for increased periods of time, for example, 12 hours.

Non-effervescent granules and powders are packaged in predetermined amounts, such that when reconstituted with a specified quantity of an appropriate liquid vehicle, usually distilled water, a solution and/or suspension results, providing a uniform concentration of the prostaglandin analog, after shaking, if necessary. The concentration of the solution is such that a teaspoonful (5 ml.), a tablespoonful (one-half ounce or 15 ml) or a fraction or a multiple thereof, will provide an effective amount to produce the desired pharmacological effect. The exact dose depends on the age, weight, and condition of the patient or animal, as is known in the art.

Effervescent granules and powders are packaged either in unit-dose, for example, tin foil packets, or in bulk, for example, in 4 oz and 8 oz. amounts, such that a specific amount, either a unit-dose or, for example, a teaspoonful, tablespoonful, or a fraction or a multiple thereof of bulk granules, when added to a specific amount of liquid vehicle, for example, water, yields a container of liquid dosage form to be ingested. The concentration of the prostaglandin analog in the granules is adjusted so that a specified amount when mixed with a specific amount of water yields an effective amount of the prostaglandin analog and produces the desired pharmacological effect. The exact amount of granules to be used depends on age, weight, and condition of the patient as is known in the art.

Liquid oral dosage forms include, for example, aqueous solutions, emulsions, suspension, solutions and/or suspensions reconstituted from non-effervescent granules and effervescent preparations reconstituted from effervescent granules. Aqueous solutions include, for example, elixirs and syrups. Emulsions are either oil-in-water (o/w) or water-in-oil (w/o).

Elixirs are clear, sweetened, hydroalcoholic preparations. Pharmaceutically acceptable substances utilized in elixirs include, for example, solvents. Syrups are concentrated aqueous solutions of a sugar, for example, sucrose, and may contain a preservative. An emulsion is a two-phase system in which one liquid is dispersed in the form of small globules throughout another liquid. o/w emulsions are much preferred for oral administration over w/o emulsions. Pharmaceutically acceptable substances utilized in emulsions are non-aqueous liquids, emulsifying agents and preservatives. Suspensions utilize pharmaceutically acceptable suspending agents and preservatives. Pharmaceutically acceptable substances utilized in non-effervescent granules, to be reconstituted into a liquid oral dosage form, include, for example, diluents, sweeteners, and wetting agents. Pharmaceutically acceptable substances utilized in effervescent granules, to be reconstituted into a liquid oral dosage form, include, for example, organic acids and a source of carbon dioxide. Coloring and flavoring agents are utilized in all of the above dosage forms.

Solvents include, for example, glycerin, sorbitol, ethyl alcohol, and syrup. Examples of preservatives include glycerin, methyl and propylparaben, benzoic acid, sodium benzoate, and alcohol. Examples of nonaqueous liquids utilized in emulsions include, for example, mineral oil, and olive oil. Examples of emulsifying agents include for example, gelatin, acacia, tragacanth, bentonite, and surfactants such as polyoxyethylene sorbitan monooleate. Suspending agents include, for example, sodium carboxymethylcellulose, pectin, tragacanth, Veegum, and acacia. Diluents include, for example, lactose and sucrose. Sweetening agents include, for example, sucrose, syrups, glycerin, and artificial sweetening agents such as sodium cyclamate and saccharin. Wetting agents include, for example, propylene glycol monostearate, sorbitan monooleate, diethylene glycol monolaurate and polyoxyethylene lauryl ether. Organic acids include, for example, citric and tartaric acid. Sources of carbon dioxide include, for example, sodium bicarbonate and sodium carbonate. Coloring agents include, for example, any of the approved certified water soluble FD and C dyes, and mixtures thereof. Flavoring agents include, for example, natural flavors extracted from plants such as fruits, and synthetic blends of compounds which produce a pleasant taste sensation.

The concentration of the prostaglandin analog throughout the solutions must be uniform. Upon shaking, the concentration of the prostaglandin analog throughout the emulsions and suspensions must be uniform.

The concentration of the prostaglandin analog is adjusted so that a teaspoonful (5 ml.), a tablespoonful (one-half ounce or 15 ml.) or a fraction or multiple thereof, will provide an effective amount to produce the produce the desired pharmacological effect. The exact dose depends on the age, weight, and condition of the patient or animal as is known in the art.

The liquid oral dosage forms may be packaged, for example, in unit-dose sizes of 5 ml. (teaspoonful), 10 ml., 15 ml. (tablespoonful) and 30 ml. (one ounce), and multiple dose containers, including, for example, 2 oz., 3 oz., 4 oz., 6 oz., 8 oz., pint, quart, and gallon sizes.

Non-effervescent granules are packaged in predetermined amounts such that when reconstituted with a specified quantity of an appropriate liquid vehicle, usually distilled water, a solution and/or suspension results providing a uniform concentration of the prostaglandin analog after shaking, if necessary. The concentration of the solution is such that a teaspoonful (5 ml.), a tablespoonful (one-half ounce or 15 ml.) or a fraction or multiple thereof will provide an effective amount to produce the desired pharmacological effect. The exact dose depends on the age, weight and condition of the patient or animal as is known in the art.

Effervescent granules are packaged either in unit-dose, for example, tin foil pakcets or in bulk, for example, in 4 oz. and 8 oz. amounts such that a specific amount, either a unit-dose or for example, a teaspoonful, tablespoonful or a fraction or multiple thereof of bulk granules when added to a specific amount of liquid vehicle, for example, water yields a container of liquid dosage form to be ingested. The concentration of the prostaglandin analog in the granules is adjusted so that a specified amount when mixed with a specific amount of water yields an effective amount of the prostaglandin analog to produce the desired pharmacological effect. The exact amount of granules to be used depends on age, weight, and condition of the patient as is known in the art.

The pharmaceutically therapeutically active compounds are administered orally or parenterally in unit-dosage forms or multiple-dosage forms. Unit-dose forms as used in the specification and claims refers to physically discrete units suitable for human and animal subjects and packaged individually as is known in the art. Each unit-dose contains a predetermined quantity of the therapeutically active compound sufficient to produce the desired thereapeutic effect, in association with the required pharmaceutical carrier, vehicle or diluent. Examples of unit-dose forms include ampules and syringes (parenteral), individually packaged tablet or capsule (oral-solid) or individually packaged teaspoonful or tablespoonful (oral-liquid). Unit-dose forms may be administered in fractions or multiples thereof. A multiple-dose form is a plurality of identical unit-dosage forms packaged in a single container to be administered in segregated unit-dose form. Examples of multiple-dose forms include vials (parenteral), bottles of tablets or capsules (oral-solid) or bottles of pints or gallons (oral-liquid). Hence, multiple dose form is a multiple of unit-doses which are not segregated in packaging. The specifications for the unit-dosage form and the multiple-dosage form are dictated by and directly dependent on (a) the unique characteristics of the therapeutically active compound and the particular therapeutic effect to be achieved and (b) the limitations inherent in the art of compounding such a therapeutically active compound for treatment of propylaxis of gastric and duodenal ulcers in mammal.

In treatment of gastric ulcers, oral administration of an appropriate dosage form is preferred because there is both local and systemic therapeutic actions by the prostaglandin analogs upon the stomach. More preferred as oral dosage forms which are in solution or which dissolve readily upon entering the stomach.

Although not necessary in the various embodiments of the inventive concept, additional active ingredients are useful in combination, for example, parasympathetic blocking agents such as methscopolamine bromide; antacids such as magnesium trisilicate, aluminum hydroxide, calcium carbonate, magnesium carbonate, magnesium oxide, tranquilizers such as chlordiazepoxide, and diazepam; sedatives such as phenobarbital; antihistamines such as pyribenzamine and chlorpheniramine; analgesics such as acetaminophen; and CNS stimulants such as amphetamine. Combinations of the various analogs of the $PGE_1$, $PGE_2$, $PGA_1$, and $PGA_2$ series are also useful.

Standard methods are available for evaluating the beneficial antisecretory effects of the prostaglandin analogs. Illustratively, using humans, after fasting overnight a gastric tube is inserted through the mouth and the residual gastric contents emptied. Gastric secretion is then stimulated by intravenous infusion of 0.6 $\mu$g./kg./hr. of pentagastrin. The prostaglandin analogs are administered either orally, through the gastric tube used to collect the gastric secretions, or intraduodenally, through a fine tube that had been swallowed the night before and found, by fluoroscopy, to be located in the duodenum at about the level of the ligament of Treitz. When the compound is administered orally, pentagastrin infusion and gastric aspiration are interrupted for 45 min. No such interruption is necessary when the prostaglandin analog is given intraduodenally. The prostaglandin analog is kept at $-20°$ in a stock solution of 200 $\mu$g./ml. of absolute ethanol. At the time of use, 0.1 to 1.0 ml. of the stock solution is diluted with saline to either 10 ml. or 16 ml. for intraduodenal and intragastric administration, respectively. Each subject is used as his own control. Gastric juice is collected every 15 min. and the volume, pH, acid concentration and acid output and pepsin concentration are determined.

The invention can be more fully understood from the following examples.

EXAMPLE 1

Capsule Formulation

| Ingredients | mg./capsule |
|---|---|
| 16,16-dimethyl-$PGE_2$ | 0.1 |
| Lactose Hydrous USP | 247.9 |
| Magnesium Stearate USP | 2.0 |

The prostaglandin analog together with a portion of the lactose is blended through a No. 7 cloth. This mixture is mixed with the remaining lactose and the magnesium stearate and passed through a No. 20 mesh screen. Following mixing in a P-K blender for 15 min. the mixture is encapsulated in No. 3 capsules.

On capsule is administered orally one to 4 times daily to humans with gastric hypersecretion with advantageously beneficial antisecretory effects in reduced volume, acidity and pepsin content of the gastric juice.

Following the above procedure, the following compounds, their esters or salts are formulated and administered in the same manner to obtain the same therapeutic result;

16-methyl-$PGE_1$, -$PGE_2$, -$PGA_1$, -$PGA_2$,
16,16-dimethyl-$PGE_1$, -$PGA_1$, -$PGA_2$,
16-ethyl-$PGE_1$, -$PGE_2$, -$PGA_1$, -$PGA_2$,
16,16-diethyl-$PGE_1$, -$PGE_2$, -$PGA_1$, -$PGA_2$,
16-ethyl-16-methyl-$PGE_1$, -$PGE_2$, -$PGA_1$, or -$PGA_2$

EXAMPLE 2

Compressed Tablet Formulation

| Ingredients | mg./tablet |
| --- | --- |
| 16,16-dimethyl-$PGE_2$ | 0.15 |
| Lactose Hydrous Spray Process | 185.0 |
| Microcrystalline Cellulose NF Medium Powder | 46.0 |
| Collodial Silicon Dioxide NF | 1.0 |
| Starch USP (Bolted) | 13.0 |
| Magnesium Stearate USP Powder Food Grade | 2.0 |

The prostaglandin analog is bolted with the starch and a portion of the collodial silicon dioxide through a No. 7 mesh cloth. This mixture is screened with the microcrystalline cellulose, lactose, and remainder of the collodial silicon dioxide through a No. 20 mesh screen. The mixture is placed in a P-K blender and mixed for about 28 minutes. Screen the magnesium stearate with a portion of mix through a No. 20 mesh screen and add to the P-K blender. Mix for an additional 2 minutes. Compress tablets of the desired shape.

One tablet is administered orally one to 4 times daily to humans with gastric hypersecretion with advantageously beneficial antisecretory effects in reduced volume, acidity and pepsin content of the gastric juice.

Following the above procedure each of the compounds described in Example 1 is formulated in tablet form and administered according to this example.

EXAMPLE 3

Elixir Formulation

| Ingredients | Amount |
| --- | --- |
| 16,16-dimethyl-$PGE_2$ methyl ester | .075 mg. |
| Alcohol USP | 15 ml. |
| Sucrose | 20 gm. |
| Flavoring Agent | as desired |
| Coloring Agent | as desired |
| Distilled water qsad | 100 ml. |

Dissolve the prostaglandin analog in the alcohol and the sucrose in 50 ml. of distilled water. The two solutions are mixed, and the resulting mixture is diluted to 100 ml. with distilled water.

One teaspoonful is adminstered orally one to 4 times daily to humans with gastric hypersecretion with advantageously beneficial antisecretory effects in reduced volume, acidity and pepsin content of the gastric juice.

Following the above procedure each of the compounds described in Example 1 including 16,16-dimethyl-$PGE_2$ is formulated in elixir form and administered according to this example.

EXAMPLE 4

Syrup Formulation

| Ingredients | Amount |
| --- | --- |
| 16,16-dimethyl-$PGE_2$ | 0.125 mg. |
| Alcohol USP | minimum amount |
| Sucrose | 40.0 gm. |
| Flavoring Agent | As desired |
| Coloring Agent | As desired |
| Methyl paraben | 75.0 mg. |
| Propyl paraben | 25.0 mg. |
| Distilled water qsad | 100.0 ml. |

The prostaglandin analog is dissolved in the alcohol and diluted with 25 ml. of water. The parabens as dissolved in hot water and the sucrose is dissolved in this mixture. The solutions are mixed and diluted to 100 ml. with distilled water.

One teaspoonful is administered orally one to 4 times daily to humans with gastric hypersecretion with advantageously beneficial antisecretory effects in reduced volume, acidity and pepsin content of the gastric juic.

Following the above procedure each of the compounds described in Example 1 is formulated in syrup form and administered according to this example.

EXAMPLE 5

Suspension Formulations

| Ingredients | Amount |
| --- | --- |
| 16,16-dimethyl-$PGE_2$ methyl ester | 0.125 mg. |
| Sucrose | 40.0 gm. |
| Methyl Paraben | 75.0 mg. |
| Propyl Paraben | 25.0 mg. |
| Sodium Carboxymethyl Cellulose | 0.5 gm. |
| Polysorbate 80 | 0.05 gm. |
| Flavoring Agent | As desired |
| Coloring Agent | As desired |
| Distilled water qsad | 100.0 ml. |

The suspending agent and surfactant are mixed with some of the water. This mixture is added to the prostaglandin analog. The parabens and the sucrose are dissolved in hot water and added to the prostaglandin mixture. The final mixture is diluted to 100 ml.

One teaspoonful is administered orally one to 4 times daily to humans with gastric hypersecretion with advantageously beneficial antisecretory effects in reduced volume, acidity and pepsin content of the gastric juice.

Following the above procedure each of the compounds described in Example 1 including 16,16-dimethyl-$PGE_2$ is formulated in suspension form and administered according to this example.

EXAMPLE 6

Parenteral Infusion or Injection Formulation

| Ingredients | Amount |
| --- | --- |
| 16,16-dimethyl-$PGE_2$ | 0.5 mg. |

-Continued

| Ingredients | Amount |
| --- | --- |
| Alcohol USP | minimum amount |
| Sodium Chloride | 22.5 mg. |
| Mannitol | 137.5 mg. |
| Water of Injection qsad | 10.0 ml. |

The prostaglandin analog is dissolved in a minimum amount of alcohol and a solution of the sodium chloride and mannitol in water for injection is added. The solution is diluted to 10 ml. and sterilized by aseptic filtration, filled into individual vials and freeze dried.

At time of use the preparation is reconstituted with 1.0 ml. of sterile water for injection containing a compatible preservative. Sterile saline is then used to dilute the reconstituted solution to a concentration of about 0.5 $\mu$g./ml. for intravenous infusion. The intravenous solutions are infused at a rate of about 0.001–.02 $\mu$g./kg./min. for about 2 to 4 hours, 2 to 3 times daily with beneficial antisecretory and antiulcer effects.

Following the above procedure each of the compounds described in Example 1 is formulated in intravenous infusion form and administered according to this example.

EXAMPLE 7

Parenteral Infusion or Injection Formulation

| Ingredients | Amount |
| --- | --- |
| 16,16-dimethyl-PGE$_2$ | 0.5 mg. |
| Absolute alcohol | minimum amount |

The prostaglandin analog is dissolved in the minimum amount of absolute alcohol, sterilized by aseptic filtration and packaged into individual vials.

At time of use the preparation is reconstituted with 1.0 ml. of sterile water for injection containing a compatible preservative. Sterile saline is then used to dilute the reconstituted solution to a concentration of about 0.5 $\mu$g./ml. for intravenous infusion. The intravenous solutions are infused at a rate of about 0.001–0.02 $\mu$g./kg./min. for about 2 to 4 hours, 2 to 3 times daily with beneficial antisecretory and antiulcer effects.

Following the above procedure each of the compounds described in Example 1 is formulated in injectable form and administered according to this example.

EXAMPLE 8

Parenteral Injectable Formulation

| Ingredients | Amount |
| --- | --- |
| 16,16-dimethyl-PGE$_2$ | 0.25 mg. |
| Alcohol USP | minimum amount |
| Benzyl alcohol | 47.25 mg. |
| Sodium chloride | sufficient to make isotonic |
| Sodium hydroxide or hydrochloric acid | sufficient for pH adjustment |
| Water for injection qsad | 5.0 ml. |

The prostaglandin analog is dissolved in a minimum amount of alcohol. The sodium chloride and benzyl alcohol are dissolved in about 3 ml. of water for injection, the solutions mixed, pH adjusted and diluted to 5.0 ml. After sterilization the solution is packaged in appropriate vials, ampules or disposable syringes.

One ml. of the solution is injected either subcutaneously or intravenously one to 4 times daily.

Following the above procedure each of the compounds described in Example 1 is formulated in injectable form and administered according to this example.

I claim:

1. A method of reducing gastric secretion in a mammal which consists essentially of administering to a mammal in need of this reduction an effective amount of a pharmaceutical preparation for an antisecretory effect on the gastric secretions either orally or parenterally in unit dosage form or a multiple dosage form comprising an optically active compound or a racemic form of that compound and the enantiomer thereof, selected from the group consisting of 16-methyl-PGE$_1$, -PGE$_2$, -PGA$_1$, -PGA$_2$,
16,16-dimethyl-PGE$_1$, -PGE$_2$, -PGA$_1$, -PGA$_2$,
16-ethyl-PGE$_1$, -PGE$_2$, -PGA$_1$, -PGA$_2$,
16,16-diethyl-PGE$_1$, -PGE$_2$, -PGA$_1$, -PGA$_2$,
16-ethyl-16-methyl-PGE$_1$, -PGE$_2$, -PGA$_1$, -PGA$_2$, pharmaceutically acceptable salts thereof, and pharmaceutically acceptable carboxylate alkyl esters thereof where the alkyl group is one to 8 carbon atoms, inclusive, in combination with a pharmaceutical carrier.

2. A method according to claim 1 wherein the mammal is a human.

3. A method according to claim 2 wherein the human has gastric or duodenal ulcers.

4. A method according to claim 2 wherein the human does not have gastric or duodenal ulcers.

5. A method according to claim 4 which is oral and the compound is optically active or racemic 16,16-dimethyl-PGE$_2$ in free acid form, salt form or methyl ester form.

6. A method according to claim 3 which is oral and the compound is optically active or racemic 16,16-dimethyl-PGE$_2$ in free acid form, salt form or methyl ester form.

7. A method according to claim 3 which is parenteral and the compound is 16,16-dimethyl-PGE$_2$ in free acid form, salt form, or methyl ester form.

8. A method according to claim 7 wherein the route of administration is by intravenous infusion.

9. A method according to claim 7 wherein the route of administration is by injection.

* * * * *